US011959772B2

(12) United States Patent
Robbins et al.

(10) Patent No.: US 11,959,772 B2
(45) Date of Patent: Apr. 16, 2024

(54) ODOMETER INTERPOLATION USING GPS DATA

(71) Applicant: Samsara Inc., San Francisco, CA (US)

(72) Inventors: Andrew Robbins, San Francisco, CA (US); Christopher Hao Zhen, San Francisco, CA (US); George Selman Leslie-Waksman, Oakland, CA (US); Changping Chen, Walnut Creek, CA (US); Cassandra Lee Rommel, Chicago, IL (US)

(73) Assignee: Samsara Inc., San Francisco, CA (US)

( * ) Notice: Subject to any disclaimer, the term of this patent is extended or adjusted under 35 U.S.C. 154(b) by 574 days.

(21) Appl. No.: 17/150,598

(22) Filed: Jan. 15, 2021

(65) Prior Publication Data

US 2022/0228887 A1   Jul. 21, 2022

(51) Int. Cl.
| | |
|---|---|
| *G01C 22/02* | (2006.01) |
| *G01C 21/16* | (2006.01) |
| *G01C 22/00* | (2006.01) |
| *G01S 5/00* | (2006.01) |
| *G01S 19/09* | (2010.01) |
| *G01S 19/49* | (2010.01) |

(52) U.S. Cl.
CPC .......... *G01C 22/02* (2013.01); *G01C 21/165* (2013.01); *G01C 22/00* (2013.01); *G01S 5/0036* (2013.01); *G01S 19/09* (2013.01); *G01S 19/49* (2013.01)

(58) Field of Classification Search
CPC .......... G01S 19/09; G01S 19/14; G01S 19/48; G01S 19/49; G01S 19/393; G01S 5/0036; G01C 21/165; G01C 22/00; G01C 22/02
USPC ......................................................... 702/165
See application file for complete search history.

(56) References Cited

U.S. PATENT DOCUMENTS

| | | | | |
|---|---|---|---|---|
| 5,390,125 A | * | 2/1995 | Sennott ..................... | G08G 1/20 |
| | | | | 701/472 |
| 5,912,635 A | * | 6/1999 | Oshizawa ............... | G01C 25/00 |
| | | | | 340/988 |
| 2013/0289873 A1 | * | 10/2013 | Mitchell ................. | G06F 17/00 |
| | | | | 701/482 |

OTHER PUBLICATIONS

Aghus Sofwan • Yosua Alvin Adi Soetrisno • Natalia Putri Ramadhani • Amiko Rahmayani • Eko Handoyo • M. Arfan, "Vehicle Distance Measurement Tuning using Haversine and Micro-Segmentation" 2019 International Seminar on Intelligent Technology and Its Applications (ISITIA) (pp. 239-243) (Year: 2019).*

* cited by examiner

*Primary Examiner* — John H Le
(74) *Attorney, Agent, or Firm* — Schwegman Lundberg & Woessner, P.A.

(57) ABSTRACT

A system to augment the collected odometer data points with more precise location data which provides an indication of a location of a vehicle associated with the odometer at a given time, such as Global Positioning System (GPS) GPS data points. Additionally, the GPS data points may be collected at a higher sampling rate than the odometer data points, thus providing a more precise indication of a distance traveled by a vehicle at any given time.

20 Claims, 7 Drawing Sheets

302 RECEIVING, FROM A VEHICLE, A FIRST ODOMETER DATA POINT THAT INCLUDES A FIRST TIMESTAMP AND A SECOND ODOMETER DATA POINT THAT INCLUDES A SECOND TIMESTAMP

304 PLOTTING THE FIRST ODOMETER DATA POINT AND THE SECOND ODOMETER DATA POINT ON A GRAPH BASED ON THE FIRST TIMESTAMP AND THE SECOND TIMESTAMP, THE GRAPH COMPRISING A FIRST AXIS THAT REPRESENTS DISTANCE VALUES AND A SECOND AXIS THAT REPRESENTS TEMPORAL VALUES

306 ACCESSING A PLURALITY OF GPS DATA POINTS BASED ON THE FIRST TIMESTAMP AND THE SECOND TIMESTAMP, THE PLURALITY OF GPS DATA POINTS COMPRISING LOCATION DATA OF THE VEHICLE

308 GENERATING A FIRST SEGMENT OF THE GRAPH BASED ON THE PLURALITY OF GPS DATA POINTS, THE FIRST SEGMENT SPANNING BETWEEN THE FIRST ODOMETER DATA POINT AND THE SECOND ODOMETER DATA POINT AND REPRESENTING A DISTANCE TRAVELED BY THE VEHICLE OVER TIME

```
┌─────────────────────────────────────────────────────────────┐
│   DETECTING MOVEMENT OF THE VEHICLE ASSOCIATED WITH THE     │
│                          ODOMETER                            │
│                            402                               │
└─────────────────────────────────────────────────────────────┘
                              │
                              ▼
┌─────────────────────────────────────────────────────────────┐
│   COLLECTING THE FIRST ODOMETER DATA POINT AND THE SECOND   │
│      ODOMETER DATA POINT BASED ON THE MOVEMENT              │
│                            404                               │
└─────────────────────────────────────────────────────────────┘
```

```
┌─────────────────────────────────────────────────────────────────┐
│ INTERPOLATING A SPEED VALUE BASED ON THE FIRST ODOMETER DATA    │
│            POINT AND THE SECOND ODOMETER DATA POINT             │
│                              502                                │
└─────────────────────────────────────────────────────────────────┘
                                 │
                                 ▼
┌─────────────────────────────────────────────────────────────────┐
│    DETERMINING THAT THE SPEED VALUE TRANSGRESSES A THRESHOLD    │
│                              VALUE                              │
│                              504                                │
└─────────────────────────────────────────────────────────────────┘
                                 │
                                 ▼
┌─────────────────────────────────────────────────────────────────┐
│   DETECTING AN ERROR BASED ON THE SPEED VALUE TRANSGRESSING     │
│                        THE THRESHOLD VALUE                      │
│                              506                                │
└─────────────────────────────────────────────────────────────────┘
                                 │
                                 ▼
┌─────────────────────────────────────────────────────────────────┐
│  ACCESSING THE PLURALITY OF GPS DATA POINTS IN RESPONSE TO THE  │
│                        DETECTING THE ERROR                      │
│                              508                                │
└─────────────────────────────────────────────────────────────────┘
```

ODOMETER INTERPOLATION USING GPS DATA

TECHNICAL FIELD

Embodiments of the present disclosure relate generally the field of fleet operation management systems for supporting operations of fleet vehicles and, more particularly, but not by way of limitation, to a system to generate odometer reports for existing regulations and mandates.

BACKGROUND

An odometer is an instrument used for measuring the distance traveled by a vehicle. An Electronic Logging Device (ELD) is electronic hardware that is attached to commercial motor vehicles to record driving hours and may often receive data points indicating distance traveled from the odometer.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

As discussed above, an ELD monitors a vehicle to capture data on whether the vehicle is moving, whether the engine is running, miles driven, and duration of engine operation. The tracked information from an ELD may be reviewed through a report generated by an administrator of the ELD. While these reports are generally accurate and thorough, distance measurements often lack the necessary precision to provide a high-resolution indication of a rate of travel or distance traveled over time. A reason for this may be inherent limitations in the way in which odometer data in gathered. For example, some odometers may lack precision below a given distance threshold (e.g., 1 km), such that only whole distance values may be reported (e.g., a distance of 1.5 km may be reported as either 1 km or 2 km). As a result, interpolation of vehicle speed using odometer data points is often imprecise and inaccurate. Accordingly, a system to improve the precision of such data would provide an advantage over existing systems.

Example embodiments described herein relate to a system to augment the collected odometer data points with more precise location data which provides an indication of a location of a vehicle associated with the odometer at a given time, such as Global Positioning System (GPS) data points. Additionally, the GPS data points may be collected at a higher sampling rate than the odometer data points, thus providing a more precise indication of a distance traveled by a vehicle at any given time. Accordingly, an odometer interpolation system is configured to perform operations that include: receiving a first odometer data point that includes a first timestamp, and a second odometer data point that includes a second timestamp; plotting the first odometer data point and the second odometer data point on a graph based on the first timestamp and the second timestamp, the graph comprising a first axis that represents distance values and a second axis that represents temporal values; accessing a plurality of GPS data points based on the first timestamp and the second timestamp of the first odometer data point and the second odometer data point, the plurality of GPS data points comprising location data; plotting the plurality of GPS data points at positions between the first odometer data point and the second odometer data point along the graph; and generating a segment that represents distance traveled over time based on the plurality of GPS data points, according to certain example embodiments.

In some example embodiments, the odometer interpolation system is configured to collect or otherwise access odometer data from an odometer, at a predefined interval responsive to detecting movement of a vehicle associated with the odometer, or responsive to detecting that the vehicle is started. For example, the odometer interpolation system may be communicatively coupled with one or more sensor devices to detect movement such as an accelerometer. In some embodiments, the odometer interpolation system may determine a vehicle is moving based on vehicle diagnostics data received from the vehicle (e.g., throttle position information).

Responsive to determining that a vehicle is in motion, the odometer interpolation system may access odometer data that indicates a distance traveled by the vehicle at a given time. Accordingly, an odometer data point may include a timestamp and a distance value. In some embodiments, the odometer interpolation system may access the odometer to collect odometer data points at a predefined interval, or sampling rate, wherein the interval may be based on a temporal frequency (i.e., every 5 seconds), based on a distance threshold (i.e., every 1 km traveled), or in some embodiments a combination of a temporal frequency and a distance threshold (i.e., every 1 km traveled or every 30 second, whichever comes first).

The odometer interpolation system may plot the odometer data points on a graph, wherein a first axis of the graph represents distance values, and a second axis of the graph represents temporal values. Distance values between any two points may be interpolated by the odometer interpolation system based on the distance and temporal values which correspond with the two odometer data points. A report that includes a display of the graph may be generated and displayed.

In some embodiments, the odometer interpolation system may access GPS data points that indicate a location of the vehicle that corresponds with the odometer data points, based on attributes of the odometer data points, such as the timestamps. The GPS data points may comprise location data and timestamps.

In some embodiments, the GPS data points may be collected by the odometer interpolation system at a predefined interval, or sampling rate, wherein the interval may be based on a temporal frequency (i.e., every 4 seconds), or based on a distance threshold (i.e., every meter traveled). In certain embodiments, a sampling rate in which the GPS data points are collected is at a greater, or higher rate, than a sampling rate in which the odometer data points are collected.

In some embodiments, the odometer interpolation system may apply GPS data points to correct detected errors or inaccuracies among the odometer data points. The odometer interpolation system may detect an error or inconsistency based on comparison of any one or more odometer data points to a threshold value. The threshold value may be a predefined threshold value or may be a dynamic threshold value that varies based on attributes of the collected odometer data points. Responsive to detecting such an error, the odometer interpolation system may retrieve a timestamp associated with the erroneous data point and retrieve a set of GPS data points based on the time stamp.

The odometer interpolation system may plot the GPS data points at positions between the first odometer data point and the second odometer data point along the graph, and generate a segment based on the GPS data points that represents distance traveled over time. Accordingly, a more precise representation of distance traveled over time may be presented, by augmenting the odometer data points with the GPS data points. For example, augmenting of the odometer data points with the GPS data points may include inserting the GPS data points between valid odometer values, wherein the odometer values may be scaled based on a ratio of odometer distance over aggregated GPS distance.

Figure 1:
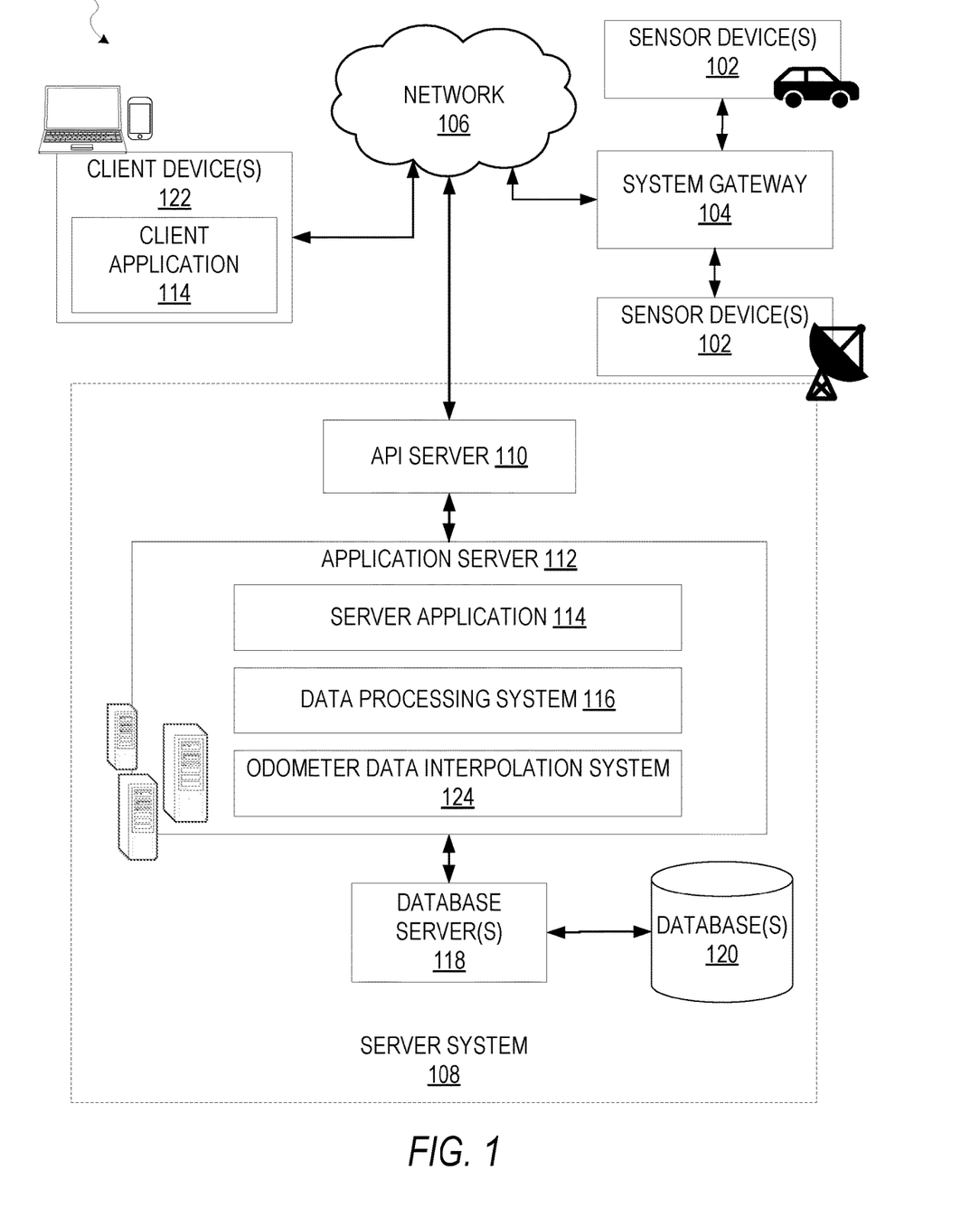
FIG. 1 is a block diagram showing an example system for exchanging data (e.g., sensor data and associated content) over a network in accordance with some embodiments, wherein the system includes an odometer data interpolation system.

FIG. 1 is a block diagram showing an example system 100 for augmenting odometer data points with GPS data points, based on certain example embodiments. The system 100 includes one or more client devices 122 that host a number of applications including a client application 114.

Accordingly, each client application 114 is able to communicate and exchange data with another client application 114 and with the server application 114 executed at the server system 108 via the network 106. The data exchanged between client applications 114, and between a client application 114 and the server system 108, includes functions (e.g., commands to invoke functions) as well as payload data (e.g., text, audio, video or other multimedia data).

The server system 108 provides server-side functionality via the network 106 to a particular client application 114, and in some embodiments to the sensor device(s) 102 and the system gateway 104. While certain functions of the system 100 are described herein as being performed by either a client application 114, the sensor device(s) 102, the system gateway 104, or by the server system 108, it will be appreciated that the location of certain functionality either within the client application 114 or the server system 108 is a design choice. For example, it may be technically preferable to initially deploy certain technology and functionality within the server system 108, but to later migrate this technology and functionality to the client application 114, or one or more processors of the sensor device(s) 102, or system gateway 104, where there may be sufficient processing capacity.

The server system 108 supports various services and operations that are provided to the client application 114. Such operations include transmitting data to, receiving data from, and processing data generated by the client application 114, the sensor devices 102, and the system gateway 104. In some embodiments, the sensor devices 102 may include an odometer associated with a vehicle, as well as a GPS associated with the vehicle. In some embodiments, this data includes, message content, device information, geolocation information, persistence conditions, social network information, sensor data, and live event information, as examples. In other embodiments, other data is used. Data exchanges within the system 100 are invoked and controlled through functions available via graphical user interfaces (GUIs) of the client application 114.

Turning now specifically to the server system 108, an Application Program Interface (API) server 110 is coupled to, and provides a programmatic interface to, an application server 112. The application server 112 is communicatively coupled to a database server 118, which facilitates access to a database 120 that stores data associated with data generated by the sensor devices 102 and processed by the application server 112.

Dealing specifically with the API server 110, this server receives and transmits data (e.g., sensor data, commands, and payloads) between the client device 122 and the application server 112. Specifically, the API server 110 provides a set of interfaces (e.g., routines and protocols) that can be called or queried by the client application 114 in order to invoke functionality of the application server 112. The API server 110 exposes various functions supported by the application server 112, including account registration, login functionality, the transmission of data, via the application server 112, from a particular client application 114 to another client application 114, the sending of sensor data (e.g., images, video, geolocation data, inertial data, temperature data, etc.) from a client application 114 to the server application 114, and for possible access by another client application 114, the setting of a collection of data, the retrieval of such collections, the retrieval of data, and the location of devices within a region.

The application server 112 hosts a number of applications and subsystems, including a server application 114, and an odometer interpolation system 124. The odometer interpolation system 124 is configured to access records within a repository (i.e., the databases 120) and automatically apply annotations to at least a portion of the records based on corresponding attributes of the records, according to some example embodiments. Further details of the odometer interpolation system 124 can be found in FIG. 2 below.

The server application 114 implements a number of data processing technologies and functions, particularly related to the aggregation and other processing of data (e.g., sensor data generated by the sensor devices 102). As will be described in further detail, the sensor data, including odometer data points and GPS data points, generated by the sensor devices 102 may be aggregated into collections associated with a particular user account. Other processor and memory intensive processing of data may also be performed server-side by the server application 114, in view of the hardware requirements for such processing.

The application server 112 is communicatively coupled to a database server 118, which facilitates access to a database 120 in which is stored data associated with sensor data generated by the sensor devices 102 and processed by the server application 114.

Figure 2:
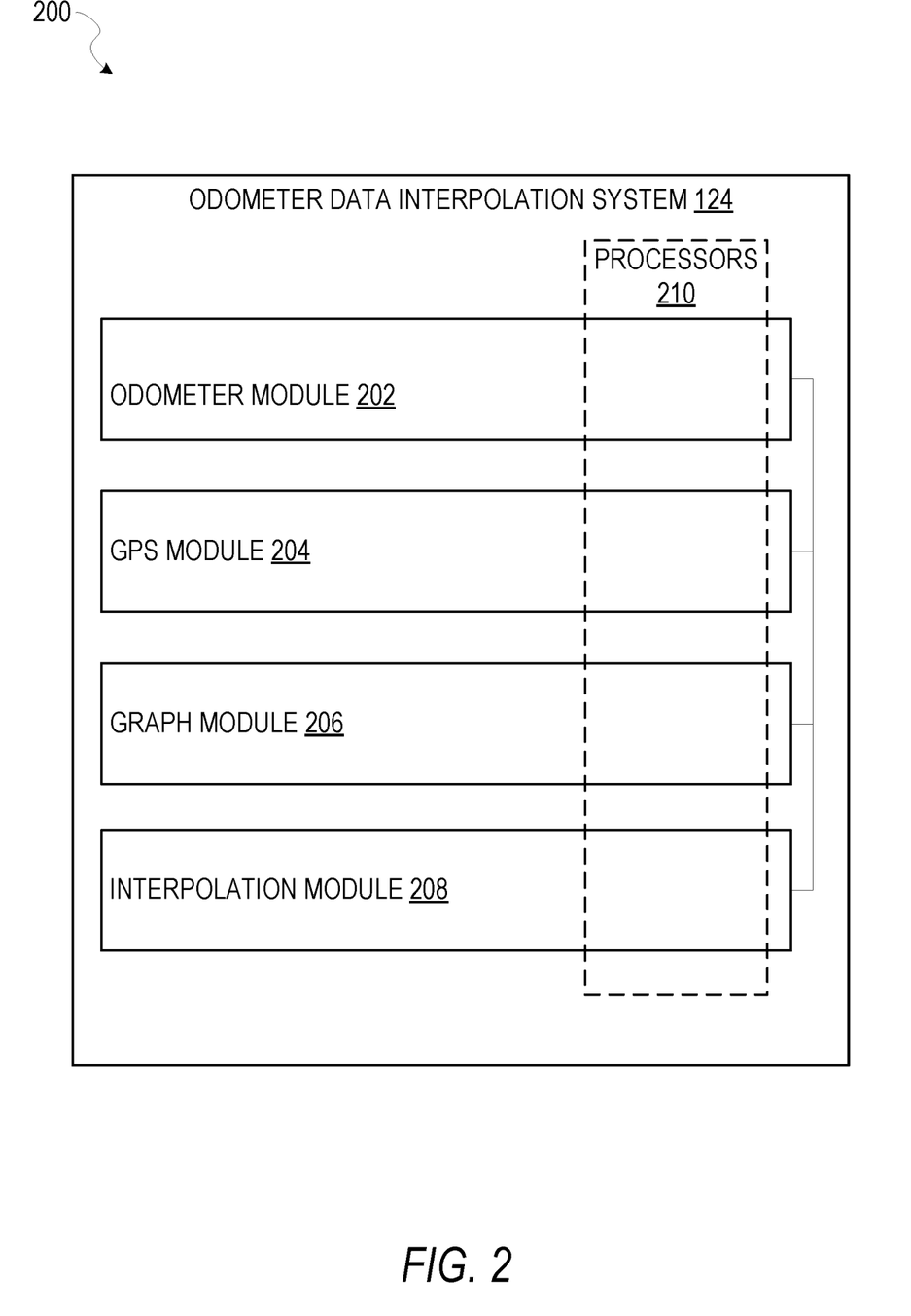
FIG. 2 is a block diagram illustrating various modules of an odometer data interpolation system, according to certain example embodiments.

FIG. 2 is a block diagram illustrating components of the odometer interpolation system 124 that configure the odometer interpolation system 124 to perform operations that include: receiving a first odometer data point that includes a first timestamp, and a second odometer data point that includes a second timestamp; plotting the first odometer data point and the second odometer data point on a graph based on the first timestamp and the second timestamp, the graph comprising a first axis that represents distance values and a second axis that represents temporal values; accessing a plurality of GPS data points based on the first timestamp and the second timestamp of the first odometer data point and the second odometer data point, the plurality of GPS data points comprising location data; plotting the plurality of GPS data points at positions between the first odometer data point and the second odometer data point along the graph; and generating a segment that represents distance traveled over time based on the plurality of GPS data points, according to certain example embodiments.

The odometer interpolation system 124 is shown as including an odometer module 202, a GPS module 204, a graph module 206, and an interpolation module 208, all configured to communicate with each other (e.g., via a bus, shared memory, or a switch). Any one or more of these modules may be implemented using one or more processors 210 (e.g., by configuring such one or more processors to perform functions described for that module) and hence may include one or more of the processors 210.

Any one or more of the modules described may be implemented using hardware alone (e.g., one or more of the processors 210 of a machine) or a combination of hardware and software. For example, any module described of the odometer interpolation system 124 may physically include an arrangement of one or more of the processors 210 (e.g., a subset of or among the one or more processors of the machine) configured to perform the operations described herein for that module. As another example, any module of the odometer interpolation system 124 may include software, hardware, or both, that configure an arrangement of one or more processors 210 (e.g., among the one or more processors of the machine) to perform the operations described herein for that module. Accordingly, different modules of the odometer interpolation system 124 may include and configure different arrangements of such processors 210 or a single arrangement of such processors 210 at different points in time. Moreover, any two or more modules of the odometer interpolation system 124 may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
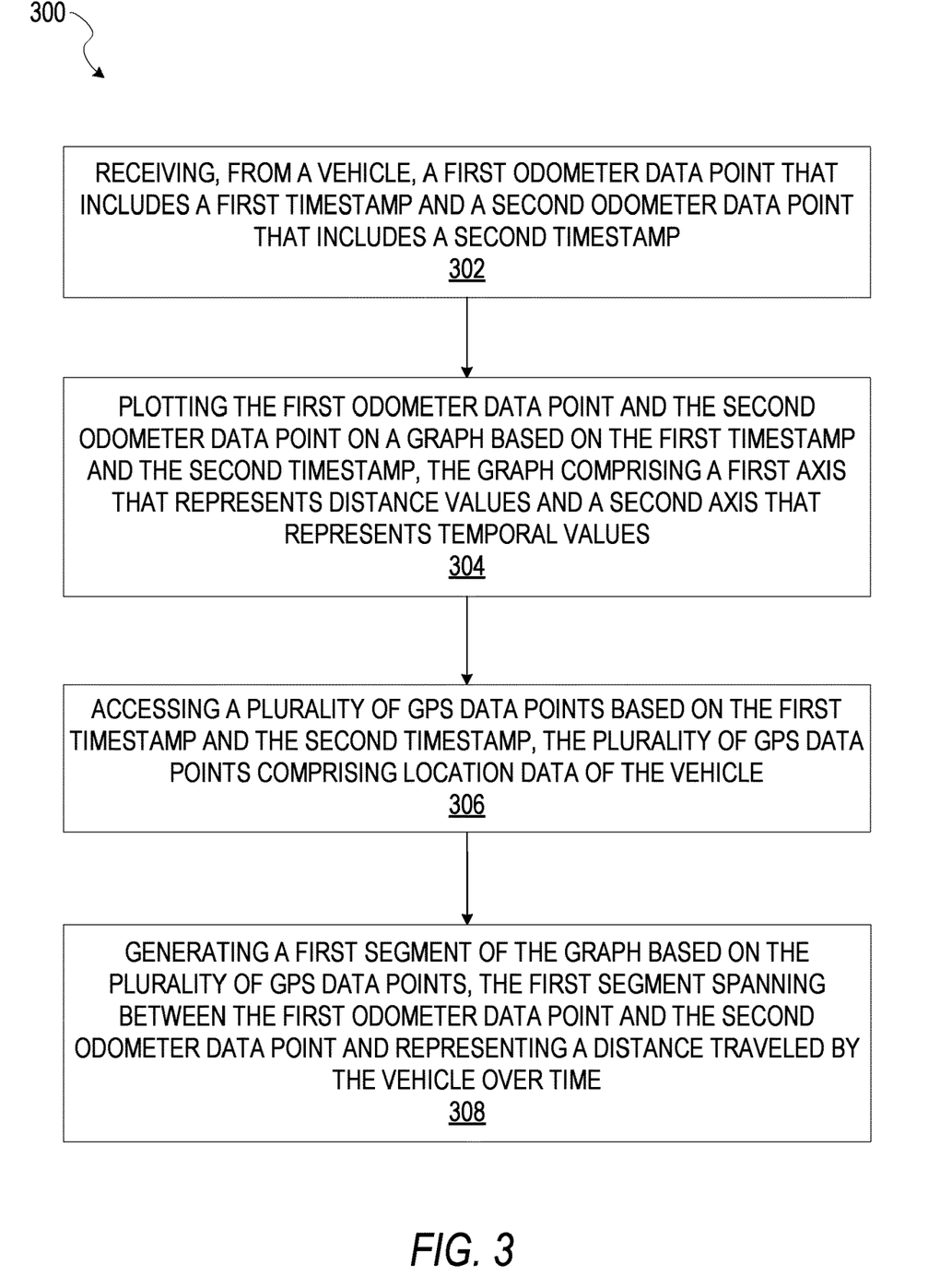
FIG. 3 is a flowchart depicting a method of interpolating odometer data, according to certain example embodiments.

FIG. 3 is a flowchart depicting a method 300 of interpolating odometer data, according to certain example embodiments. Operations of the method 300 may be performed by the modules described above with respect to FIG. 2. As shown in FIG. 3, the method 300 includes one or more operations 302, 304, 306, and 308.

At operation 302, the odometer module 202 receives, from a vehicle, a first odometer data point that includes a first timestamp, and a second odometer datapoint that includes a second timestamp, and wherein the first and second odometer data points indicate a distance traveled by a vehicle at a given time as indicated by the corresponding timestamps.

In some embodiments, the odometer module 202 may access odometer data at a predefined sampling rate, wherein the sampling rate is based on a temporal frequency (i.e., every 5 seconds). In further embodiments, the odometer (i.e., sensor device 102) may report an odometer data point to the odometer module 202 at a sampling rate, wherein the sampling rate may include a distance threshold. For example, the odometer may report a data point to the odometer module 202 at the completion of every 1 km.

At operation 304, the graph module 206 plots the first odometer data point and the second odometer data point on a graph based on the corresponding first and second timestamps, wherein the graph comprises a first axis that represent distance value and a second axis that represents temporal values.

At operation 306, the GPS module 204 accesses a plurality of GPS data points based on the first timestamp and the second timestamp, wherein the plurality of GPS data points comprise location data indicating a location of a vehicle, and corresponding timestamps. For example, in some embodiments, a GPS system associated with the vehicle (i.e., a sensor device 102), may report a GPS data point to GPS module 306 at a sampling rate, wherein the sampling rate may be based on a temporal frequency, and wherein the sampling rate of the GPS data points is greater than a sampling rate of the odometer data points.

At operation 308, the graph module 206 plots the GPS data points at positions between the first odometer data point and the second odometer data point based on corresponding timestamps of the GPS data points. The interpolation module 208 generates a segment based on the GPS data points, wherein the segment represents a distance traveled by the vehicle over time. The aggregate GPS distance may be scaled to match the distance between the first and second odometer data points.

In some embodiments, the operations for plotting the odometer data points and the GPS data points may further comprise adding the data points to a dense tabular data table. Accordingly the system may thereby generate a report based on the dense tabular data table.

Figure 4:
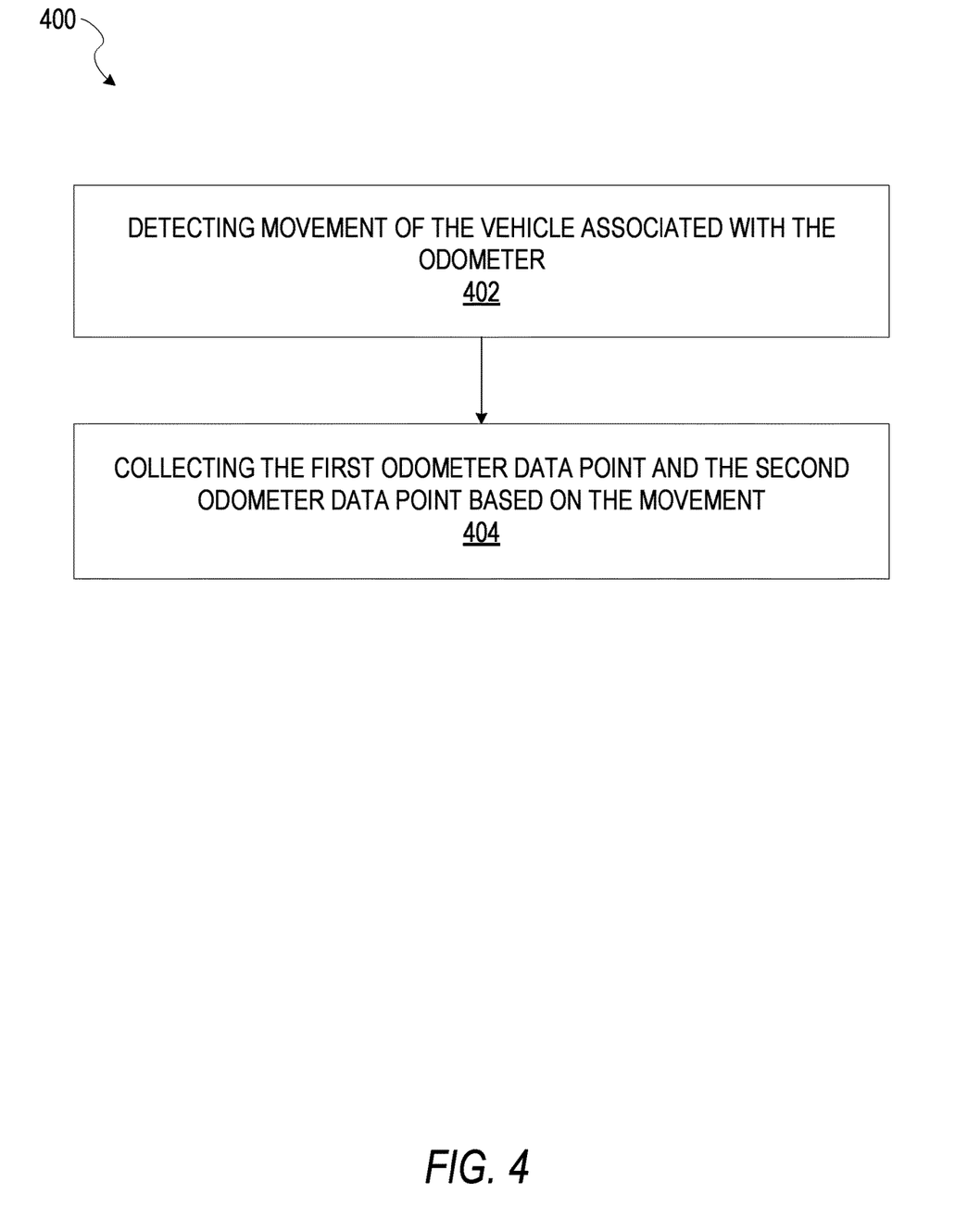
FIG. 4 is a flowchart depicting a method of collecting odometer data, according to certain example embodiments

FIG. 4 is a flowchart depicting a method 400 of collecting odometer data, according to certain example embodiments. Operations of the method 400 may be performed by the modules described above with respect to FIG. 2. As shown in FIG. 4, the method 400 includes one or more operations 402, and 404.

At operation 402, the odometer interpolation system 124 detect movement of a vehicle associated with the odometer (i.e., the sensor device 102). For example, the odometer interpolation system 124 may be communicatively coupled with an accelerometer located within the vehicle or based on vehicle diagnostics data gathered from the vehicle.

Responsive to detecting the movement of the vehicle associated with the odometer, at operation 404 the odometer module 202 collects the first odometer data point and the second odometer data point at a sampling rate, wherein the sampling rate may include a temporal frequency, or a distance threshold.

Figure 5:
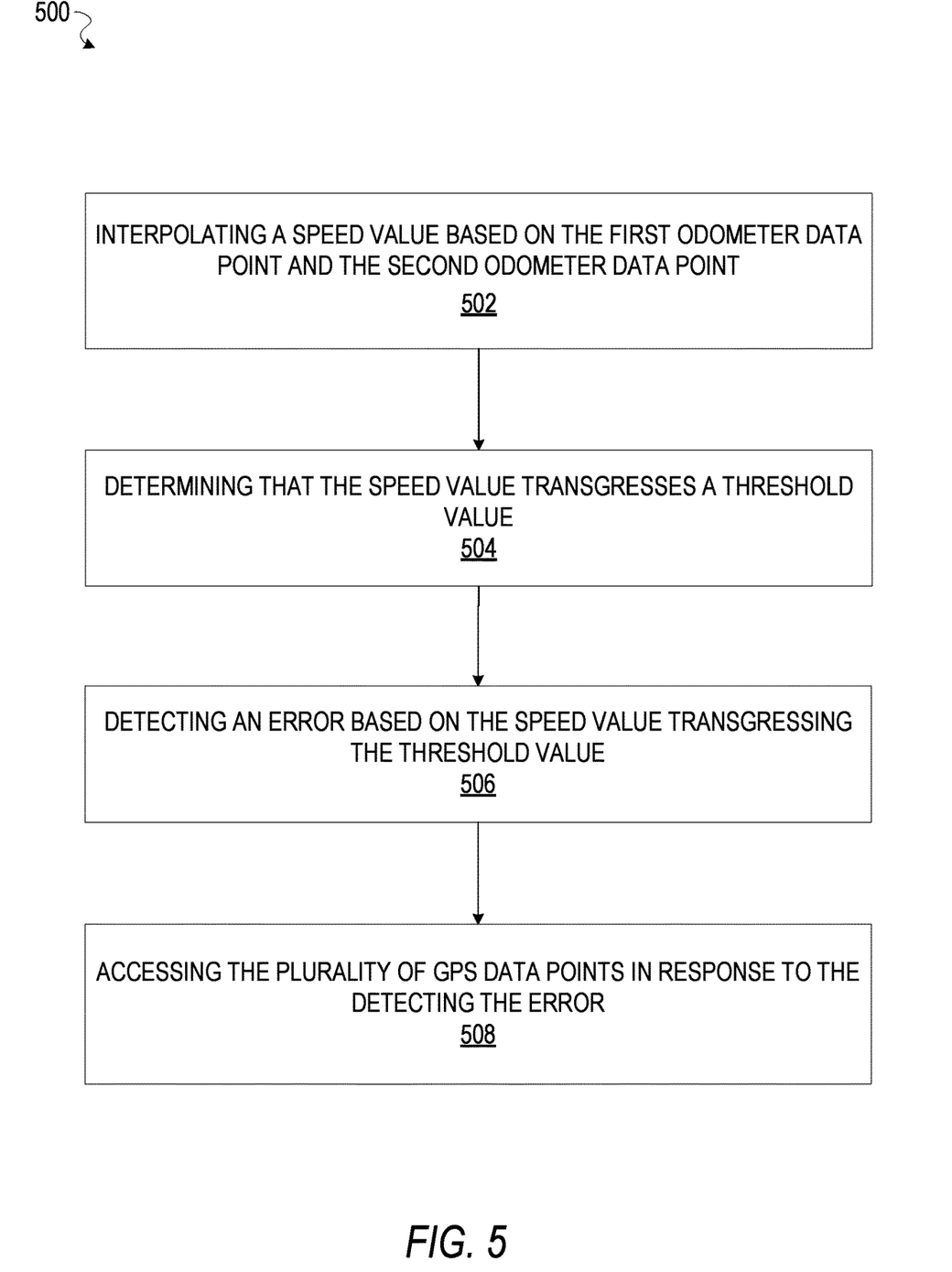
FIG. 5 is a flowchart depicting a method of collecting GPS data, according to certain example embodiments.

FIG. 5 is a flowchart depicting a method 500 of collecting GPS data, according to certain example embodiments. Operations of the method 500 may be performed by the modules described above with respect to FIG. 2. As shown in FIG. 5, the method 500 includes one or more operations 502, 504, 506, and 508.

At operation 502, the interpolation module 208 determines a speed value based on a set of odometer data points that include the first odometer data point and the second odometer data point. The interpolation module 208 may apply linear interpolation, in which linear values may be applied to construct a sequence of data points within the discrete range of values defined by the first data point and the second data point.

At operation 504, the interpolation module 208 may determine that the interpolated speed value transgresses a threshold value, wherein the threshold value may be a predefined threshold value, or in some embodiments may be determined based on the preceding or proceeding odometer data points. For example, the interpolation module 208 may determine a first speed value based on the first and second odometer data points, and compare the interpolated speed value with a speed value interpolated based on other subsets of the odometer data points to determine whether or not the interpolated speed value is within an expected range.

Accordingly, at operation 506, responsive to determining that the interpolated speed value transgresses the threshold value, the interpolation module 208 determines that an error has been detected. The error detected by the interpolation module 208 may include an indication of a timestamp of the erroneous data point (or points).

At operation 508, the GPS module 204 accesses a plurality GPS data points responsive to the interpolation module 208 detecting the error. In some embodiments, the GPS module 204 may access the plurality of GPS data points based on the timestamp of the erroneous data point of points. The GPS data points may then be applied to the graph to correct the error and the interpolation module 208 may interpolate an updated speed value. For example, in some embodiments, the GPS module 204 may throw out the erroneous odometer data points (creating an error gap in the series of data points), and interpolate between the valid odometer data points on either side of the error gap using GPS data points.

Figure 6:
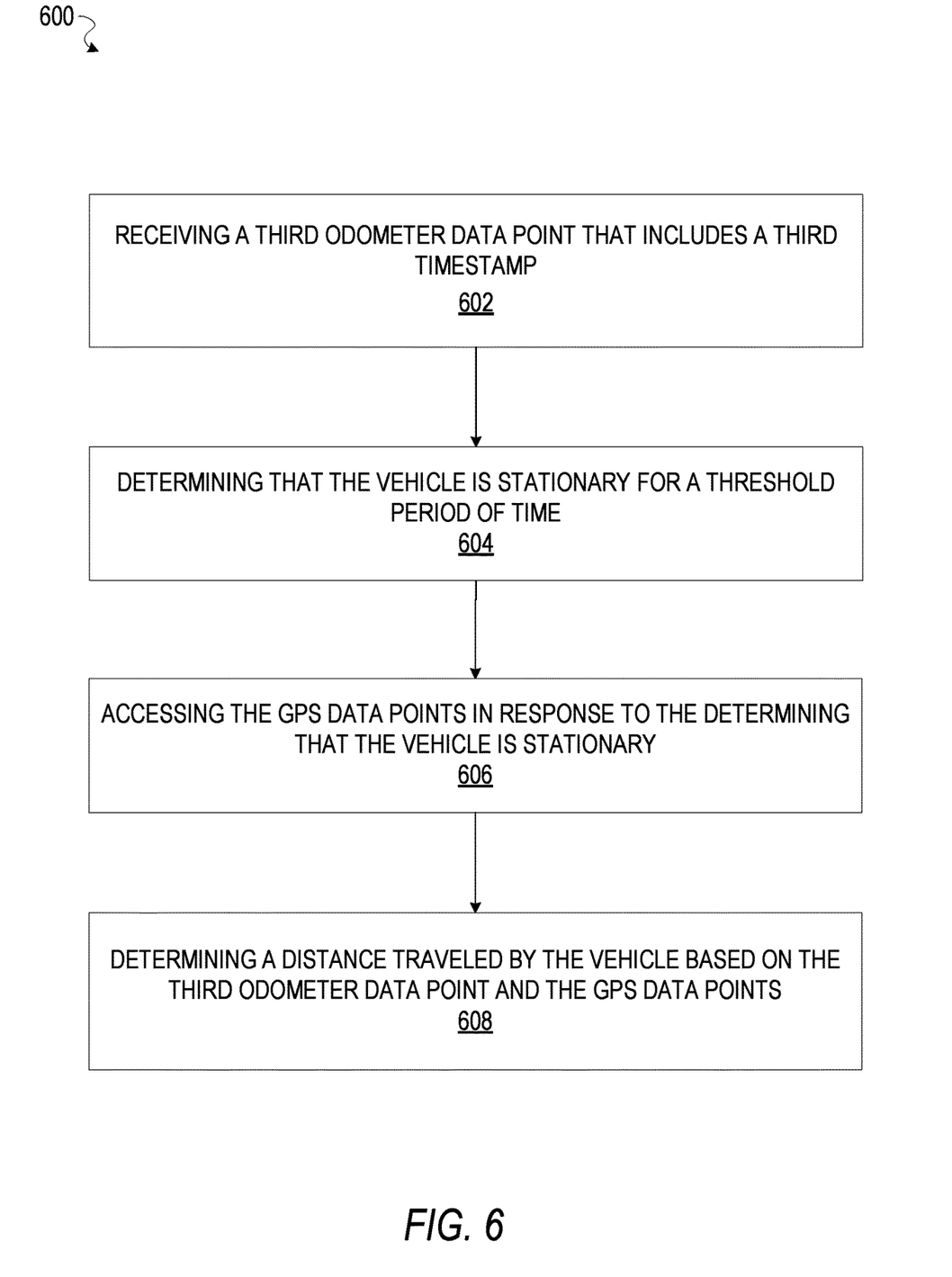
FIG. 6 is a flowchart depicting a method of augmenting odometer data using GPS data, according to certain example embodiments.

FIG. 6 is a flowchart depicting a method 600 of augmenting odometer data using GPS data, according to certain example embodiments. As discussed above, the odometer interpolation system 124 may interpolate a rate of travel of a vehicle based on pairs of odometer data points. A common issue arising in systems which rely entirely on odometer data to track a distance traveled by a vehicle is the lack of precision. For example, an odometer may be limited in the precision of the distance measured and can only report data points that represents whole numbers (i.e., 10 km), but are unable to report partial distances (i.e., 10.2 km). As a result, if a vehicle finishes a trip before the odometer is able to click over to a whole distance value, the distance reported by the odometer may be off by a significant margin (e.g., off by 999 meters).

Operations of the method 600 may be performed by the modules described above with respect to FIG. 2. As shown in FIG. 6, the method 600 includes one or more operations 602, 604, 606, and 608. The method 600 may be performed as a precursor to, or subroutine of, one or more of the operations of the method 400, as depicted in FIG. 4.

At operation 602, the odometer module 202 receives a third odometer data point that comprises a timestamp and an indication of a distance traveled by the vehicle.

At operation 604, the odometer interpolation system 124 receives an indication that the vehicle associated with the odometer is stationary for a threshold period of time. For example, in some embodiments, the odometer interpolation system may access an accelerometer, or vehicle diagnostics data, in order to determine that the vehicle has come to a stop. Upon determining that the vehicle is stationary for a threshold period of time (e.g., 5 minutes), the odometer interpolation system may conclude that vehicle has concluded a trip.

At operation 606, responsive to determining that the vehicle has been stationary for a threshold period of time, the GPS module 204 accesses a set of GPS data points based on the timestamp of the third odometer data point, wherein the set of GPS data points provide an indication of one or more locations of the vehicle.

At operation 608, the interpolation module 208 determines a distance traveled by the vehicle based on the third odometer data point, and the set of GPS data points. For example, the distance traveled by the vehicle may be based on a sum of the third odometer data point and the length of each segment represented by the GPS data points.

Figure 7:
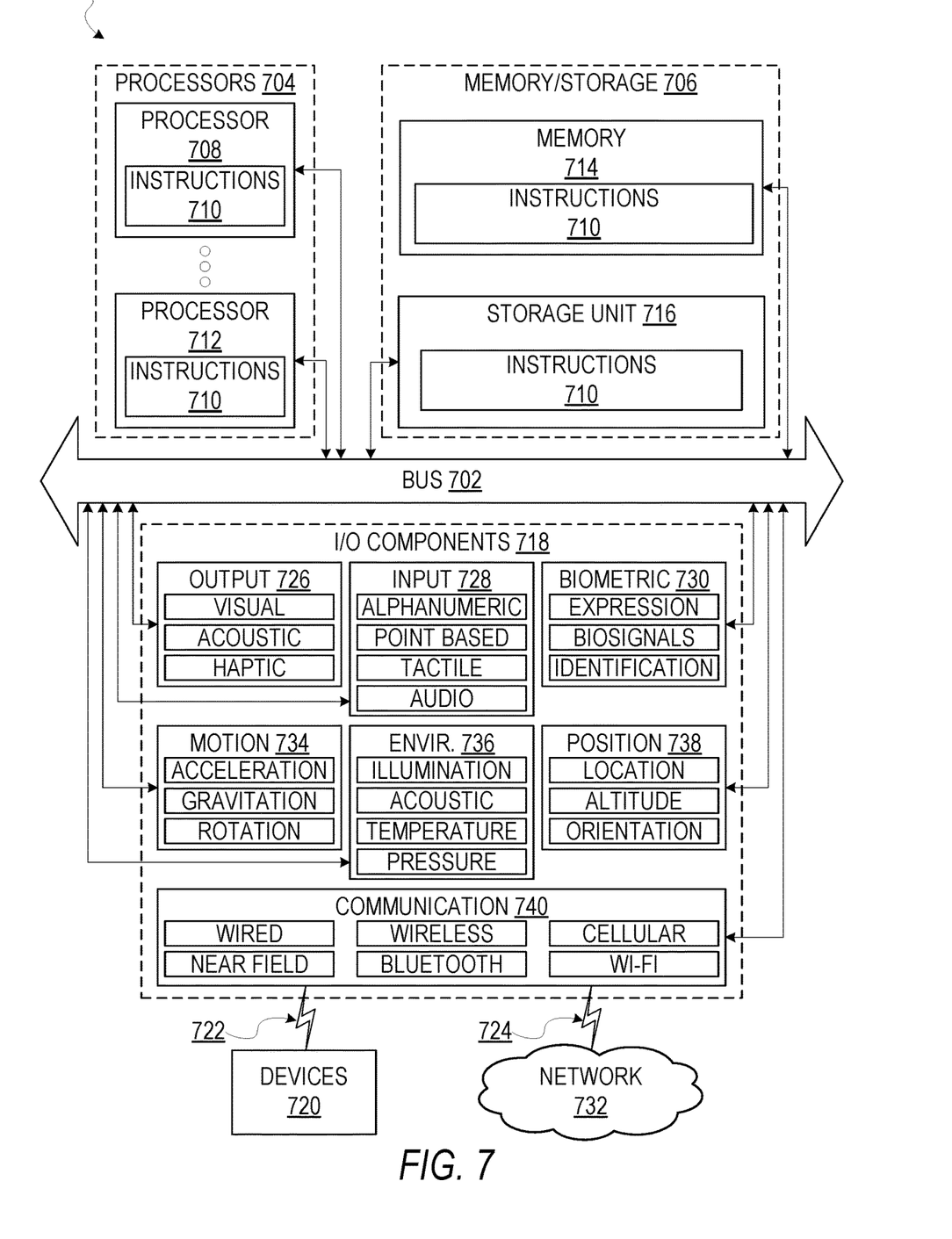
FIG. 7 is a block diagram illustrating components of a machine, according to some example embodiments, able to read instructions from a machine-readable medium (e.g., a machine-readable storage medium) and perform any one or more of the methodologies discussed herein.

FIG. 7 is a block diagram illustrating components of a machine 700, according to some example embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 710 (e.g., software, a program, an application, an applet, an app, or other executable code) for causing the machine 700 to perform any one or more of the methodologies discussed herein may be executed. As such, the instructions 710 may be used to implement modules or components described herein. The instructions 710 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), other smart devices, a web appliance, a network router, a network switch, a network bridge, or any machine capable of executing the instructions 710, sequentially or otherwise, that specify actions to be taken by machine 700. Further, while only a single machine 700 is illustrated, the term "machine" shall also be taken to include a collection of machines that individually or jointly execute the instructions 710 to perform any one or more of the methodologies discussed herein.

The machine 700 may include processors 704, memory memory/storage 706, and I/O components 718, which may be configured to communicate with each other such as via a bus 702. The memory/storage 706 may include a memory 714, such as a main memory, or other memory storage, and a storage unit 716, both accessible to the processors 704 such as via the bus 702. The storage unit 716 and memory 714 store the instructions 710 embodying any one or more of the methodologies or functions described herein. The instructions 710 may also reside, completely or partially, within the memory 714, within the storage unit 716, within at least one of the processors 704 (e.g., within the processor's cache memory), or any suitable combination thereof, during execution thereof by the machine 700. Accordingly, the memory 714, the storage unit 716, and the memory of processors 704 are examples of machine-readable media.

The I/O components 718 may include a wide variety of components to receive input, provide output, produce output, transmit information, exchange information, capture measurements, and so on. The specific I/O components 718 that are included in a particular machine 700 will depend on the type of machine. For example, portable machines such as mobile phones will likely include a touch input device or other such input mechanisms, while a headless server machine will likely not include such a touch input device. It will be appreciated that the I/O components 718 may include many other components that are not shown in FIG. 7. The I/O components 718 are grouped according to functionality merely for simplifying the following discussion and the grouping is in no way limiting. In various example embodiments, the I/O components 718 may include output components 726 and input components 728. The output components 726 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 728 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 718 may include biometric components 730, motion components 734, environmental environment components 736, or position components 738 among a wide array of other components. For example, the biometric components 730 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 734 may include acceleration sensor components (e.g., accelerometer), gravitation sensor components, rotation sensor components (e.g., gyroscope), and so forth. The environment components 736 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 738 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 718 may include communication components 740 operable to couple the machine 700 to a network 732 or devices 720 via coupling 722 and coupling 724 respectively. For example, the communication components 740 may include a network interface component or other suitable device to interface with the network 732. In further examples, communication components 740 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 720 may be another machine or any of a wide variety of peripheral devices (e.g., a peripheral device coupled via a Universal Serial Bus (USB)).

Moreover, the communication components 740 may detect identifiers or include components operable to detect identifiers. For example, the communication components 740 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 740, such as, location via Internet Protocol (IP) geo-location, location via Wi-Fi® signal triangulation, location via detecting a NFC beacon signal that may indicate a particular location, and so forth.

GLOSSARY

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

What is claimed is:

1. A method comprising:
   receiving a first odometer data point that includes a first timestamp, and a second odometer data point that includes a second timestamp;
   plotting the first odometer data point and the second odometer data point on a graph based on the first timestamp and the second timestamp, the graph comprising a first axis that represents distance values and a second axis that represents temporal values;
   accessing a plurality of GPS data points based on the first timestamp and the second timestamp of the first odometer data point and the second odometer data point, the plurality of GPS data points comprising location data;
   plotting the plurality of GPS data points at positions between the first odometer data point and the second odometer data point along the graph;
   generating a segment that comprises a length attribute that depicts a represents distance traveled over time based on the plurality of GPS data points; and
   causing display of the segment upon the graph based on the length attribute.

2. The method of claim 1, wherein the first odometer data point and the second odometer data point are collected from an odometer associated with a vehicle, and the receiving the first odometer data point and the second odometer data point includes:
   detecting movement at the vehicle associated with the odometer; and
   collecting the first odometer data point and the second odometer data point in based on the movement.

3. The method of claim 1, wherein the receiving the first odometer data point and the second odometer data point includes:
   collecting the first odometer data point and the second odometer data point at a predefined sampling rate.

4. The method of claim 3, wherein the predefined sampling rate includes one or more of a temporal based sampling rate and a distance based sampling rate.

5. The method of claim 1, wherein the method further comprises:
   interpolating a speed value based on the first odometer data point and the second odometer data point.

6. The method of claim 5, wherein the method further comprises:
   determining that the speed value transgresses a threshold value;
   detecting an error based on the speed value transgressing the threshold value; and
   accessing the plurality of GPS data points in response to the detecting the error.

7. The method of claim 1, wherein the receiving the first odometer data point and the second odometer data point includes receiving the first odometer data point and the second odometer data point at a first sampling rate, and wherein the accessing the plurality of GPS data points includes accessing the plurality of GPS data points at a second sampling rate.

8. The method of claim 7, wherein the second sampling rate is at a greater frequency than the first sampling rate.

9. A system comprising:
   a memory; and
   at least one hardware processor to perform operations comprising:
   receiving a first odometer data point that includes a first timestamp, and a second odometer data point that includes a second timestamp;
   plotting the first odometer data point and the second odometer data point on a graph based on the first timestamp and the second timestamp, the graph comprising a first axis that represents distance values and a second axis that represents temporal values;
   accessing a plurality of GPS data points based on the first timestamp and the second timestamp of the first odometer data point and the second odometer data point, the plurality of GPS data points comprising location data;
   plotting the plurality of GPS data points at positions between the first odometer data point and the second odometer data point along the graph;
   generating a segment that comprises a length attribute that depicts a distance traveled over time based on the plurality of GPS data points; and
   causing display of the segment upon the graph based on the length attribute.

10. The system of claim 9, wherein the first odometer data point and the second odometer data point are collected from an odometer associated with a vehicle, and the receiving the first odometer data point and the second odometer data point includes:
    detecting movement at the vehicle associated with the odometer; and
    collecting the first odometer data point and the second odometer data point in based on the movement.

11. The system of claim 9, wherein the receiving the first odometer data point and the second odometer data point includes:
 collecting the first odometer data point and the second odometer data point at a predefined sampling rate.

12. The system of claim 11, wherein the predefined sampling rate includes one or more of a temporal based sampling rate and a distance based sampling rate.

13. The system of claim 9, wherein the operations further comprise:
 interpolating a speed value based on the first odometer data point and the second odometer data point.

14. The system of claim 13, wherein the operations further comprise:
 determining that the speed value transgresses a threshold value;
 detecting an error based on the speed value transgressing the threshold value; and
 accessing the plurality of GPS data points in response to the detecting the error.

15. The system of claim 9, wherein the receiving the first odometer data point and the second odometer data point includes receiving the first odometer data point and the second odometer data point at a first sampling rate, and wherein the accessing the plurality of GPS data points includes accessing the plurality of GPS data points at a second sampling rate.

16. The system of claim 15, wherein the second sampling rate is at a greater frequency than the first sampling rate.

17. A non-transitory machine-readable storage medium comprising instructions that, when executed by one or more processors of a machine, cause the machine to perform operations comprising:
 receiving a first odometer data point that includes a first timestamp, and a second odometer data point that includes a second timestamp;
 plotting the first odometer data point and the second odometer data point on a graph based on the first timestamp and the second timestamp, the graph comprising a first axis that represents distance values and a second axis that represents temporal values;
 accessing a plurality of GPS data points based on the first timestamp and the second timestamp of the first odometer data point and the second odometer data point, the plurality of GPS data points comprising location data;
 plotting the plurality of GPS data points at positions between the first odometer data point and the second odometer data point along the graph;
 generating a segment that comprises a length attribute that depicts a distance traveled over time based on the plurality of GPS data points; and
 causing display of the segment upon the graph based on the length attribute.

18. The non-transitory machine-readable storage medium of claim 17, wherein the first odometer data point and the second odometer data point are collected from an odometer associated with a vehicle, and the receiving the first odometer data point and the second odometer data point includes:
 detecting movement at the vehicle associated with the odometer; and
 collecting the first odometer data point and the second odometer data point in based on the movement.

19. The non-transitory machine-readable storage medium of claim 17, wherein the receiving the first odometer data point and the second odometer data point includes:
 collecting the first odometer data point and the second odometer data point at a predefined sampling rate.

20. The non-transitory machine-readable storage medium of claim 19, wherein the predefined sampling rate includes one or more of a temporal based sampling rate and a distance based sampling rate.

* * * * *

UNITED STATES PATENT AND TRADEMARK OFFICE
CERTIFICATE OF CORRECTION

| | |
|---|---|
| PATENT NO. | : 11,959,772 B2 |
| APPLICATION NO. | : 17/150598 |
| DATED | : April 16, 2024 |
| INVENTOR(S) | : Robbins et al. |

It is certified that error appears in the above-identified patent and that said Letters Patent is hereby corrected as shown below:

In the Claims

In Column 13, Line 59, in Claim 1, before "distance", delete "represents"

Signed and Sealed this
Thirteenth Day of August, 2024

Katherine Kelly Vidal
*Director of the United States Patent and Trademark Office*